(12) United States Patent
Chin et al.

(10) Patent No.: US 10,394,730 B2
(45) Date of Patent: Aug. 27, 2019

(54) DISTRIBUTED INTERRUPT SCHEME IN A MULTI-PROCESSOR SYSTEM

(71) Applicant: Cavium, LLC, Santa Clara, CA (US)

(72) Inventors: Bryan W. Chin, San Diego, CA (US); Wu Ye, Cupertino, CA (US); Yoganand Chillarige, Cambridge, MA (US); Paul G. Scrobohaci, Menlo Park, CA (US); Scott Lurndal, San Jose, CA (US)

(73) Assignee: Cavium, LLC, San Jose, CA (US)

( * ) Notice: Subject to any disclaimer, the term of this patent is extended or adjusted under 35 U.S.C. 154(b) by 898 days.

(21) Appl. No.: 14/541,685

(22) Filed: Nov. 14, 2014

(65) Prior Publication Data

US 2016/0140064 A1   May 19, 2016

(51) Int. Cl.
*G06F 13/26* (2006.01)
*G06F 1/08* (2006.01)
*G06F 1/12* (2006.01)
*G06F 13/16* (2006.01)

(52) U.S. Cl.
CPC .......... *G06F 13/26* (2013.01); *G06F 1/08* (2013.01); *G06F 1/12* (2013.01); *G06F 13/1652* (2013.01); *G06F 13/1673* (2013.01)

(58) Field of Classification Search
CPC ...... G06F 11/261; G06F 11/27; G06F 11/006; G06F 13/24; G06F 9/4812
USPC .......................................................... 710/301
See application file for complete search history.

(56) References Cited

U.S. PATENT DOCUMENTS

| | | | | |
|---|---|---|---|---|
| 5,764,998 A * | 6/1998 | Deshpande | ............ | G06F 13/26 710/260 |
| 5,905,897 A * | 5/1999 | Chou | ............ | G06F 13/24 710/260 |
| 5,918,057 A * | 6/1999 | Chou | ............ | G06F 13/26 710/260 |
| 5,925,115 A * | 7/1999 | Ponte | ............ | G06F 13/26 710/260 |
| 5,943,507 A * | 8/1999 | Cornish | ............ | G06F 13/24 710/260 |
| 6,052,739 A * | 4/2000 | Bopardikar | ............ | G06F 9/4812 710/266 |
| 6,205,508 B1 * | 3/2001 | Bailey | ............ | G06F 13/26 710/260 |
| 6,401,154 B1 * | 6/2002 | Chiu | ............ | G06F 13/24 710/260 |
| 6,401,197 B1 * | 6/2002 | Kondo | ............ | G06F 1/24 713/1 |

(Continued)

*Primary Examiner* — Titus Wong
(74) *Attorney, Agent, or Firm* — pkalousek.ip

(57) ABSTRACT

Methods and systems are disclosed for routing and distributing interrupts in a multi-processor computer to various processing elements within the computer. A system for distributing the interrupts may include a plurality of logic devices configured in a hierarchical tree structure that distributes incoming interrupts to interrupt redistributors (redistribution devices). The system also includes plural processing elements, where each processing element has an associated bus address. A shared serial bus couples the redistribution devices and processing elements. Each of the redistribution devices is configured to transfer the incoming interrupts to at least one of the processing elements over the common bus, based on the bus address.

14 Claims, 6 Drawing Sheets

(56) References Cited

U.S. PATENT DOCUMENTS

| | | | |
|---|---|---|---|
| 2003/0061424 A1* | 3/2003 | Leete | G06F 13/24 710/260 |
| 2007/0043347 A1* | 2/2007 | Solomita | G06F 9/4812 606/33 |
| 2008/0155137 A1* | 6/2008 | Muppirala | G06F 9/4856 710/39 |
| 2013/0086290 A1* | 4/2013 | Venkumahanti | G06F 13/24 710/264 |

* cited by examiner

DISTRIBUTED INTERRUPT SCHEME IN A MULTI-PROCESSOR SYSTEM

TECHNICAL FIELD

The present disclosure relates generally to multi-processor computers, and in particular, to new and improved techniques for communicating interrupts is such systems.

BACKGROUND

In computer systems, an interrupt is a signal to a processor emitted by a hardware device or software indicating an event that needs immediate attention. An interrupt alerts the processor to a high-priority condition requiring the interruption of the current programming code the processor is executing.

In a multi-processor computer, i.e., a computer that has more than one processor, as the number of processors increases, the number wires distributing interrupts signals increases and the complexity of appropriately distributing interrupts to the processors grows.

Known methods and architectures of distributing interrupts in multi-processor systems present certain limitations, particularly in situations where there is a large number of processors in the system and/or the processors are located on different chips in a system. Thus, there is a need for improved methods and techniques for distributing and handling interrupts in a computer system having multiple processors.

SUMMARY

The improvements disclosed herein reduce the wiring complexity and chip area required to distribute interrupt signals in a multi-processor architecture.

According to an aspect of this disclosure, a system for routing interrupts in a multi-processor computer includes a means for distributing one or more incoming interrupts to at least one of a plurality of redistribution devices. In some configurations of the system, the distribution means may include a plurality of logic devices configured in a hierarchical tree structure that distributes the incoming interrupts to the redistributors (redistribution devices). The system also includes processing elements, where each processing element has an associated bus address, and a bus coupling the redistribution devices and processing elements. Each of the redistribution devices is configured to transfer the incoming interrupts to at least one of the processing elements over the bus, based on the bus address. According to an aspect of this disclosure, a method of distributing one or more interrupts in a system having a plurality of processing elements is described. The method includes distributing one or more incoming interrupts through a plurality of logic devices configured in a hierarchical tree structure to at least one of a plurality of redistributors; and transferring the incoming interrupts from the at least one redistributor to at least one of the processing elements over a shared interrupt bus coupling the redistributors and the processing elements.

Other aspects, features, advantages and variations of the improvements described herein will be or will become apparent to one with skill in the art upon examination of the following figures and detailed description. It is intended that all such additional aspects, features, variations and advantages be included within this description and be protected by the accompanying claims.

BRIEF DESCRIPTION OF THE DRAWINGS

It is to be understood that the drawings are solely for purpose of illustration and do not define the limits of the appended claims. Furthermore, the components in the figures are not necessarily to scale. In the figures, like reference numerals designate corresponding parts throughout the different views.

DETAILED DESCRIPTION

The following detailed description, which references to and incorporates the drawings, describes and illustrates one or more specific embodiments of what is claimed. These embodiments, offered not to limit but only to exemplify and teach the invention, are shown and described in sufficient detail to enable those skilled in the art to practice the invention defined by the claims. Thus, where appropriate to avoid obscuring the invention, the description may omit certain information known to those of skill in the art. The embodiments disclosed herein are examples that should not be read to unduly limit the scope of the claims.

The word "exemplary" is used throughout this application to mean "serving as an example, instance, or illustration." Any embodiment or feature described herein as "exemplary" is not necessarily to be construed as preferred or advantageous over other embodiments or features.

Some of the examples of the interrupt distribution systems and methods disclosed herein are described in the context of an ARM (Advanced RISC Machine) multi-core architecture. In at least one example, the cores (i.e., processing elements) are each an ARM core, such as any of the CORTEX® series cores. An ARM core uses an instruction set architectures for processor cores based on a reduced instruction set computing (RISC) architecture developed by the British company ARM Holdings, Plc. The ARM core specifications can be found at www.arm.com. In some instances, the ARM core supports a 32-bit address space and 32-bit arithmetic. In some instances, the ARM core supports a 64-bit address space and 64-bit arithmetic, or both 32 and 64 bit address spaces and 64 and 32 bit arithmetic.

Figure 1:
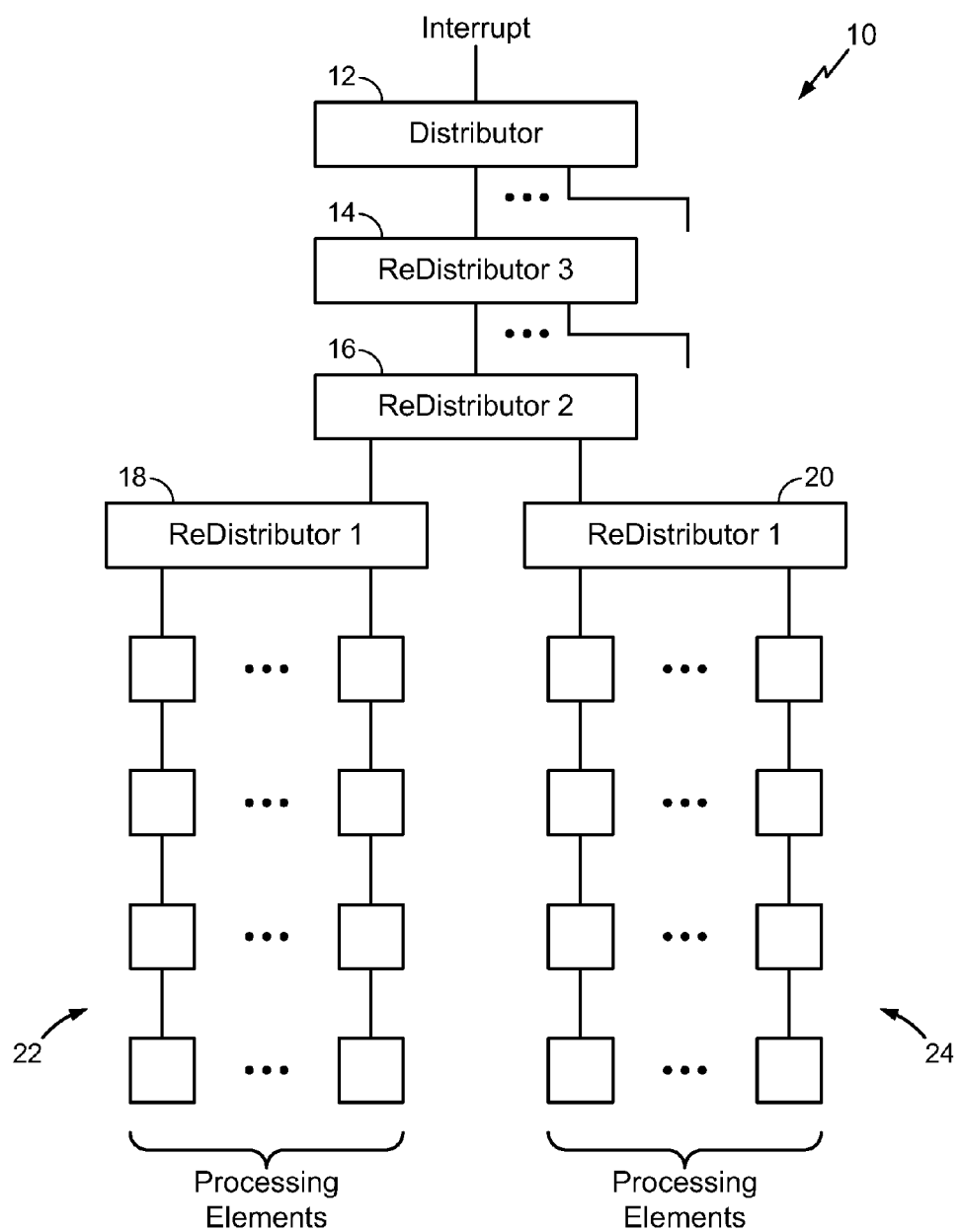
FIG. 1 is a conceptual block diagram illustrating certain components of an exemplary interrupt signal distribution system.

FIG. 1 is a conceptual block diagram illustrating certain components of an exemplary interrupt signal distribution system 10 that may be included in a multi-processor system. Essentially, the system 10 routes incoming interrupts to one or more destination processing elements 22, 24. The interrupts may be generated, for example, by software (SGI), by a peripheral device (LPI) or by system components, such as processing elements 22, 24 themselves. The interrupts may each be a signal (e.g., a wire) or a multi-bit message conveyed on a bus. In multi-bit form, the interrupt may include a multi-bit address that specifies a destination processing element that is to receive the interrupt.

The interrupt distribution system 10 includes logic devices (e.g., distributor 12 and intermediate redistributors 14, 16) configured in a hierarchical tree structure to distribute one or more incoming interrupts to at least one of a plurality of last-level redistributors (e.g., level 1 redistributors 18, 20). In the example shown, a top-level distributor 12 is configured to receive an interrupt. The distributor 12 in turn passes the incoming interrupt to one or more level 3 redistributors 14. The level 3 redistributors 14 route the interrupt to the appropriate level 2 redistributor 16 (there may be more than one level 2 redistributor), and in turn, the level 2 redistributor routes the interrupt to the appropriate level 1 (or last-level) redistributor 18, 20.

The level 1 redistributor 18, 20 that receives the incoming interrupt then routes the interrupt to the appropriate destination processing element, which is one of the processing elements 22, 24. In the system 10, each level 1 redistributor 18, 20 is connected to a predefined group of processing elements, 22, 24, respectively. The example system 10 includes sixteen processing elements coupled to each level 1 redistributor 18, 20 so that the system includes a total of thirty-two processing elements 22, 24. The system 10 can include any suitable number of processing elements.

In the example system 10 of FIG. 1, interrupt requests are routed hierarchically through the tree structure from the distributor 12 down through the redistributors 14, 16, 18, 20 to the processing elements 22, 24. The address of the interrupt may specified in a hierarchical manner A.B.C.D which fully specifies the processing elements that is targeted by an interrupt. For example, address field A may be a single bit that specifies a level 3 redistributor 14, address field B may be a two-bit address field that specifies a level 2 redistributor 12, address field C may be a single-bit address field that specifies a level 1 redistributor 18, 20, and address field D may be a four-bit address field that specifies a destination processing element 22, 24.

The logic devices, including distributor 12 and lower level redistributors 14, 16, 18 and 20 and the tree structure, may be implemented using any suitable combination of logic hardware, such as address decoders, muxes, de-muxes, logic gates and the like.

Figure 2:
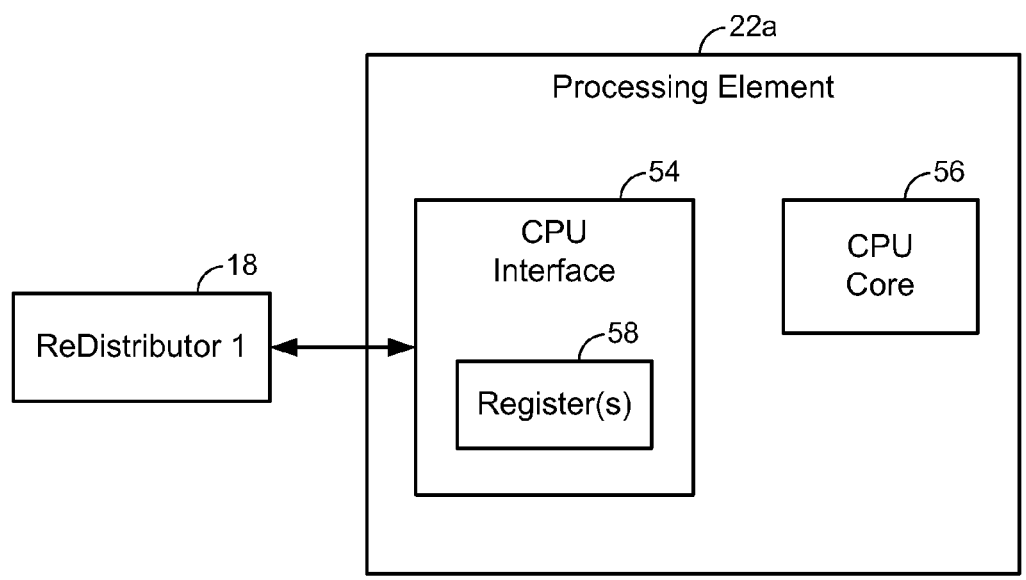
FIG. 2 is a conceptual block illustrating certain components of each the processing elements shown in FIG. 1.

In the interrupt system 10, each processing element 22, 24 includes a CPU interface 54 and CPU core 56, as shown in FIG. 2. The CPU core 56 may be an ARM core. As shown in FIG. 2, the level 1 redistributor 18 is directly coupled to the CPU interface 54 of one of its corresponding processing elements 22*a*. The CPU interface 54 in each processing element 22, 24 provides an endpoint for interrupt delivery. The interrupt delivery scheme described provides each CPU core 56 with an interface to the interrupt controller (tree structure), i.e., the CPU interface 54. The CPU interface may include one or more registers 58 which are logically part of the CPU core 56 system registers, and they may be accessed via register access instructions executed by the CPU core 56. The registers 58 may store interrupts delivered to the processing element 22*a* by the system 10, which may then be accessed by the CPU core 56. In a typical implementation, the CPU interface 54 is connected directly to the CPU core 56 to minimize communication delays and wire length. The GIC architecture employs a level 1 redistributor 18 for each CPU core 56 that is configured to communicate both with the CPU interface 54 and the rest of the interrupt system components (higher level redistributors 14, 16, interrupt translation services, the top-level distributor 12, and the like).

The ARM architecture specifies an interrupt delivery mechanism where all of the processing elements 22, 24 are on a single chip and that those processing elements are part of a tree of devices (system 10), as shown in FIG. 1. The system 10 addresses an interrupt delivery mechanism that has multiple processing elements connected to a single, logical interrupt controller. The ARM Architecture's GIC (Generic Interrupt Controller) Architecture assumes a single chip implementation where the interrupt controller and the processing elements (cores) that it services are all on the same chip. This assumption simplifies the connections needed to send interrupts to each core by leveraging on-chip interconnect with minimal and uniform delays. In a system with a small number of processing elements, the cost of connecting the last-level redistributor to both the processing element and the rest of the interrupt controller components may be solved by providing dedicated wires between each last-level redistributor and its corresponding processing elements.

However, if the number of cores is large, within one chip, the number of wires required to convey the interrupt information can become problematic in implementation of the chip. As the number of processing elements 22, 24 on a chip is increased, the cost of having dedicated wires between the last-level redistributors 18, 20 and the processing elements may become prohibitive in terms of chip area. In addition, it may often be the case that the processing elements 22, 24 belong to a different clock domain running at a different clock frequency than the rest of the interrupt controller. For example, the interrupt controller (e.g., distributor 12 and level 3-level 1 redistributors 14, 16, 18, 20) may run in a slower clock domain than the processing elements 22, 24. Having different clock domains may require additional buffering on each interrupt line from the level 1 redistributors 18, 20 to the processing elements 22, 24, thus consuming additional chip area to implement the interrupt distribution scheme where individual interrupt lines connect each processing element.

Figure 3:
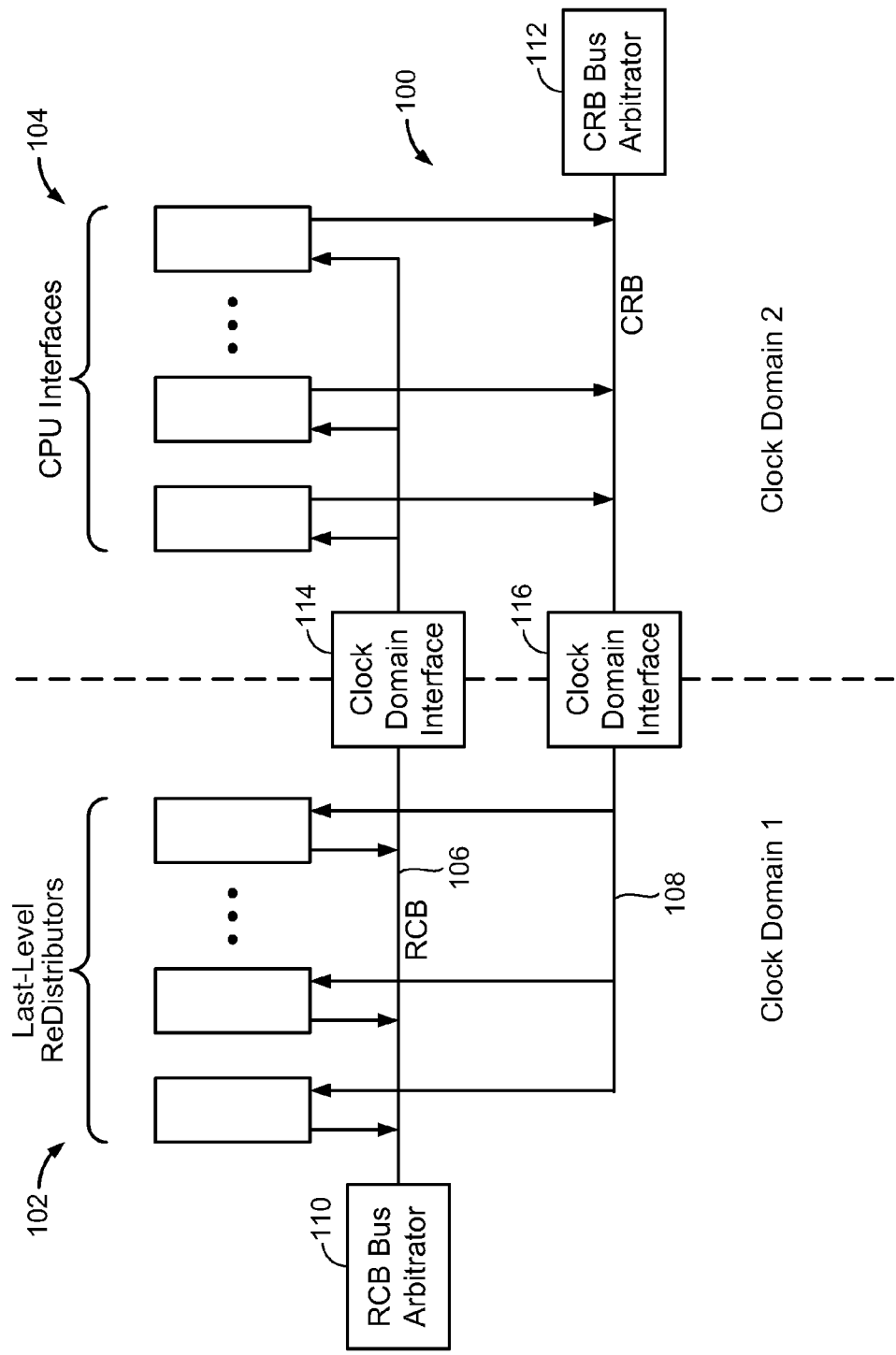
FIG. 3 is a conceptual block diagram illustrating certain details an exemplary interrupt distribution bus connecting the last-level redistributors and processing elements.

A solution to this problem is to provide a shared, interrupt distribution bus 100 that encapsulates the communication between the last-level redistributors 18, 20 and the processing elements 22, 24, as shown in FIG. 3. FIG. 3 shows level 1 (last-level) redistributors 102 of FIG. 1 communicating interrupts to the CPU interfaces 104 of the processing elements 22, 24 over a common bus 100. The shared common bus 100 includes a redistributor-to-CPU bus (RCB) 106 for communicating interrupt messages from the last-level redistributors 102 to the CPU interfaces 104. The shared common bus 100 further includes a CPU-to-redistributor bus (CRB) 108 for communicating interrupt-related messages (e.g., ACKs) from the CPU interfaces 104 to the last-level redistributors 102. The RCB 106 and CRB 108 may each be a synchronous, serial byte-wide bus. Each of the CPU interfaces 104 has a unique interrupt bus address, and thus, an interrupt bus address corresponds to each processing element. Each of the last-level redistributors 102 also has a unique interrupt bus address.

An RCB bus arbitrator 110 acts as a bus master that arbitrates access to the shared RCB 106 among the last-level redistributors 102. Any suitable bus arbitration scheme may be employed that individually grants bus access to each last-level redistributor 102 so as to prevent bus contention on the RCB 106.

A CRB bus arbitrator 112 acts as a bus master that arbitrates access to the shared CRB 108 among the CPU interfaces 104. Any suitable bus arbitration scheme may be employed that individually grants bus access to each CPU interface 104 so as to prevent bus contention on the CRB 108.

As shown in the example of FIG. 3, the redistributors 102 may operate according to a first clock domain (clock domain 1) and the CPU interfaces 104 may operates according to a different, second clock domain (clock domain 2) having a clock frequency that is different from that of the first clock domain. The clock frequency of clock domain 1 (interrupt controller clock) may be lower than the clock frequency of clock domain 2 (CPU core clock). In circumstances where there are different clock domains governing the redistributors 102 and CPU interfaces 104, the redistributors 102 transfer data to and from the shared interrupt bus 100 according to the clock frequency of clock domain 1, and each CPU interface 104 transfers data to and from the shared interrupt bus 100 according to the clock frequency of clock domain 2.

To synchronize bus transfers between the two clock domains, an RCB clock domain interface 114 is included on the RCB 106, and an CRB clock domain interface 116 is included on the CRB 106. The interfaces 114, 116 each may include a bus buffer, serial registers, a FIFO or any other suitable logic hardware for synchronizing the RCB 106 and CRB 108, respectively, across the clock domain boundary.

Figure 4:
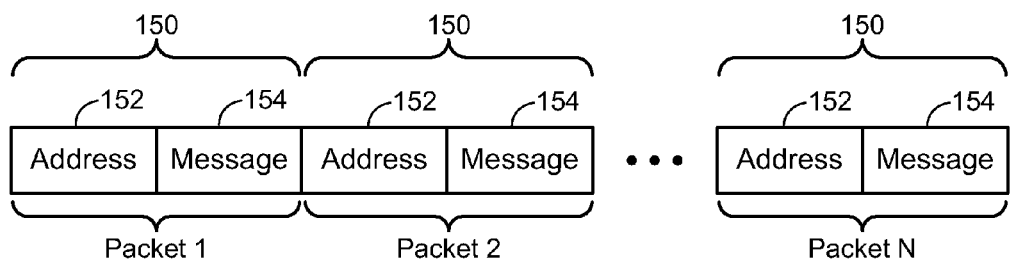
FIG. 4 illustrates an exemplary packet structure that can be used by the interrupt distribution bus shown in FIG. 3.

FIG. 4 illustrates an exemplary packet structure 150 that can be used by the interrupt distribution bus 100 on both the RCB 106 and the CRB 108. The packet encapsulation takes the message to be conveyed between any particular last-level redistributor 102 and any particular CPU interface 104, i.e., processing element 22, 24.

Each of the redistributors 102 and CPU interfaces 104 is configured to send and receive interrupt packets 150 over the shared interrupt bus 100. Each interrupt packet 150 may include an address field 152 containing the interrupt bus address of a destination CPU interface 104 or destination redistributor 102. Each packet 150 also includes an interrupt message field 154 containing an interrupt message. The interrupt message may define at least a type of incoming interrupt (SGI, LPI, etc.) being asserted when transferred over the RCB 106, or on the CRB 108, an interrupt receive acknowledgement (ACK) generated by the destination CPU core. An additional example of an interrupt message encapsulated in the interrupt packets 150 includes a remove interrupt message from one of the redistributors 102 to one of the CPU interfaces 104.

In an example bus configuration, the address field 152 and message field 154 may each be one byte, where the packet bytes are serially transferred over each the RCB 106 and CRB 108.

Figure 5:
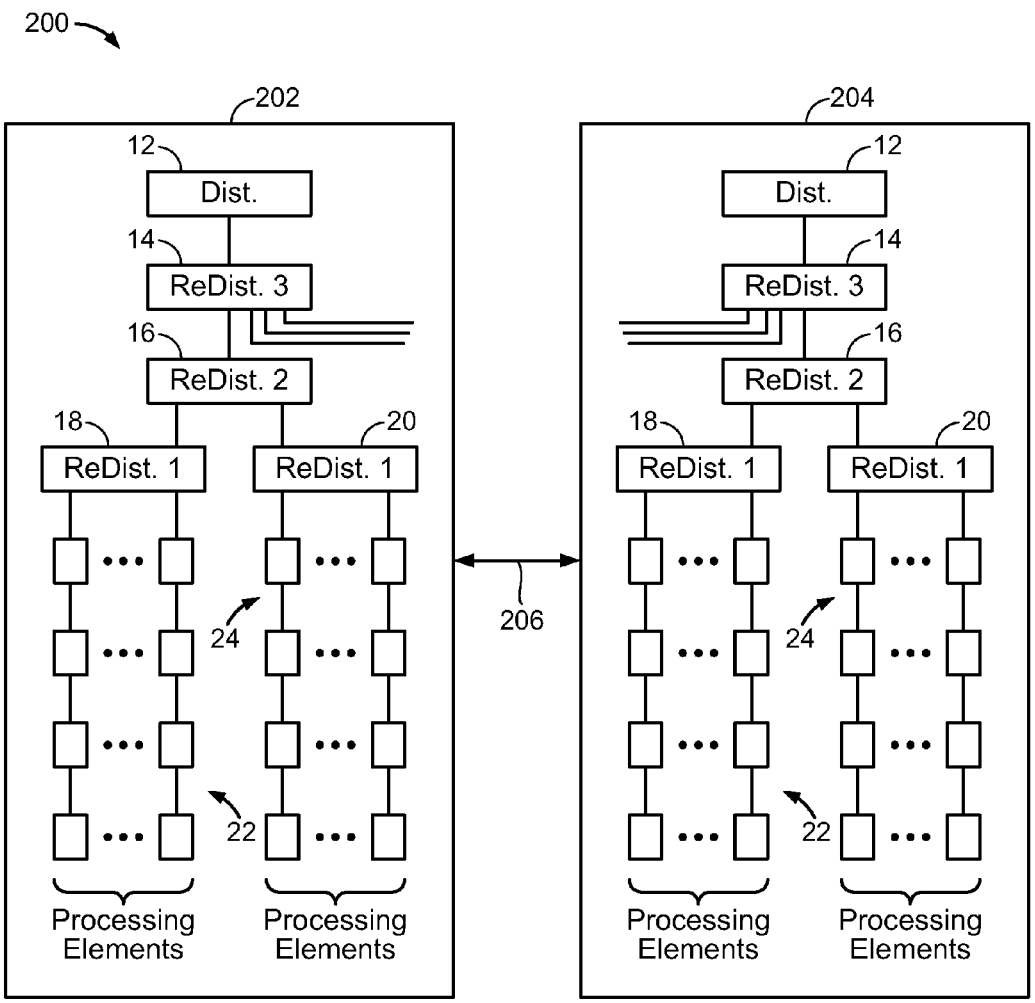
FIG. 5 is a conceptual block diagram illustrating certain components of an exemplary a multi-chip processor system, where each chip includes an interrupt distribution tree.

FIG. 5 is a conceptual block diagram illustrating certain components of an exemplary a multi-chip processor system 200, where each chip 202, 204 includes an interrupt controller distribution tree, such as the one described in connection with FIGS. 1-2. Where multiple chips or devices are part of a coherent multi-processor system, the interrupt distribution tree needs to be extended across the multiple chips and/or devices. A communication interface 206, such as a standard inter-chip bus may be used to communicate interrupts and interrupt related information (e.g., interrupt ACKs) between the interrupt distribution trees in each chip 202, 204.

FIG. 5 depicts a multi-root interrupt distribution architecture. In the multi-root architecture, each chip/device has its own top-level distributor 12. This can be problematic in some situations, such as an ARM multi-processor architecture, because the architecture may assume that there is only one interrupt distributor tree in its memory map. In multi-socket coherent systems, a common method of partitioning the resources between the chips is to allocate large contiguous parts of the memory map address space to each chip. In a conventional ARM architecture, each chip would have its own interrupt distribution tree, but each tree would be located at a non-contiguous address space. This would break the illusion of a single interrupt controller in a coherent system by splitting the interrupt controller registers into non-contiguous address spaces and would force software to make special accommodations for such a multi-chip implementation.

Figure 6:
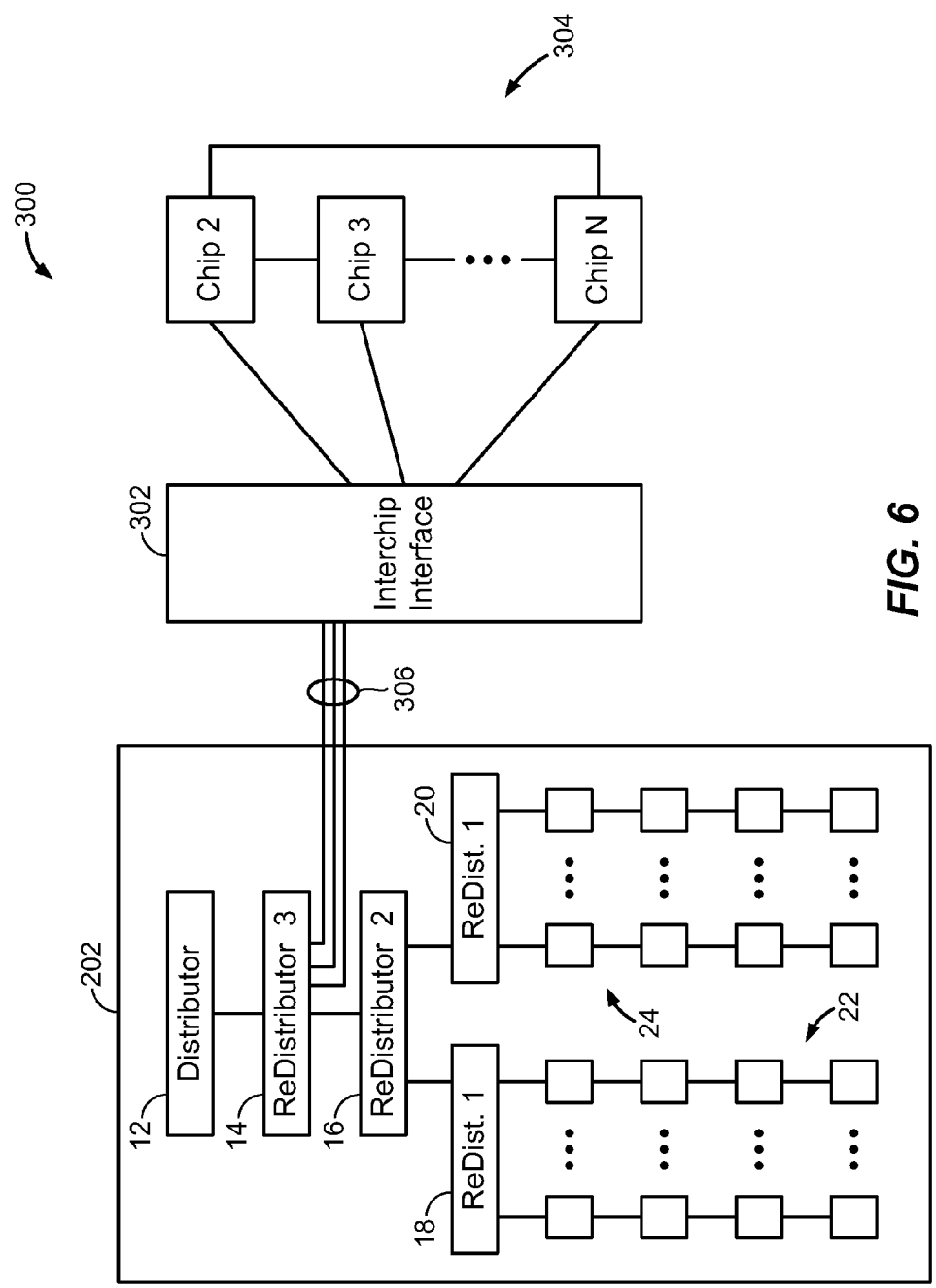
FIG. 6 is a conceptual block diagram illustrating an exemplary architecture for interrupt signal distribution in a multi-chip multi-processor system.

The architecture shown in FIG. 6 overcomes the problem of non-contiguous interrupt address space in an ARM multi-chip multi-processor system 300. FIG. 6 is a conceptual block diagram illustrating an exemplary multi-chip architecture for interrupt signal distribution in a multi-chip, multi-processor system 300 that maintains a contiguous interrupt address space. The architecture (aka system) 300 includes a root chip 202 communicating interrupt messages and interrupt related messages to/from one or more other chips 304 by way of an interchip interface 302. Each of the other chips 304 may include an internal interrupt distribution tree having the same components 12, 14, 16, 18, 20 and multiple processing elements 22-24 as the root chip 202. These internal components of each of the other chips 304 are not shown in order to simplify the drawing.

The system 300 employs a single root scheme. In a single root scheme, one of the chips (chip 1) 202 in a multi-chip network is elected the root node. Its interrupt distributor 12 and level 3 redistributor 14 are the active root of the tree, across the entire multi-chip system 300. The other chips' top-level distributor and redistributors are deactivated and remain dormant. The level 3 distributor 14 in the root chip 202 distributes incoming interrupt requests that are address to the other chips 304 over interrupt output lines 306. The interchip interface 302 then routes the interrupts to the level 2 redistributor (not shown) of the destination chip (one of the other chips 304). The level 2 redistributor of the destination chip in turn distributes the incoming interrupt request through the chip's lower level redistributors to the destination processing element(s). The hierarchical interrupt addressing scheme described herein in connection with FIG. 1 may be used in the multi-chip architecture 300.

The root chip 202 may be elected (i.e., selected) from the chips is the system 300 by setting a designated hardware pin on the chip 202, for example grounding the pin, to indicate that the chip is the root chip 202. Another way of electing the root chip 202 may include firmware designating the root chip 202 at boot-time from among the system chips using a node ID.

The interchip interface 302 is responsible for sending and receiving data between chips 202, 304. For example, it can route interrupt data between the root chip 202 and any of the other chips 304, or alternatively it can route interrupt data between the other chips 304, for example, between chip 2 and chip 3. The interchip interface 302 can be implemented as a shared bus, point to point bus, or similar interconnect. The interchip interface 302 is responsible for reliable delivery of data (packets) from one chip/device to another. The interface may have multiple connections to different chips/devices and is responsible for directing interrupts to the appropriate chip/device. The multiple connections in one implementation may comprise multiple physical channels to avoid potential deadlock or interference between messages of differing types.

Figure 7:
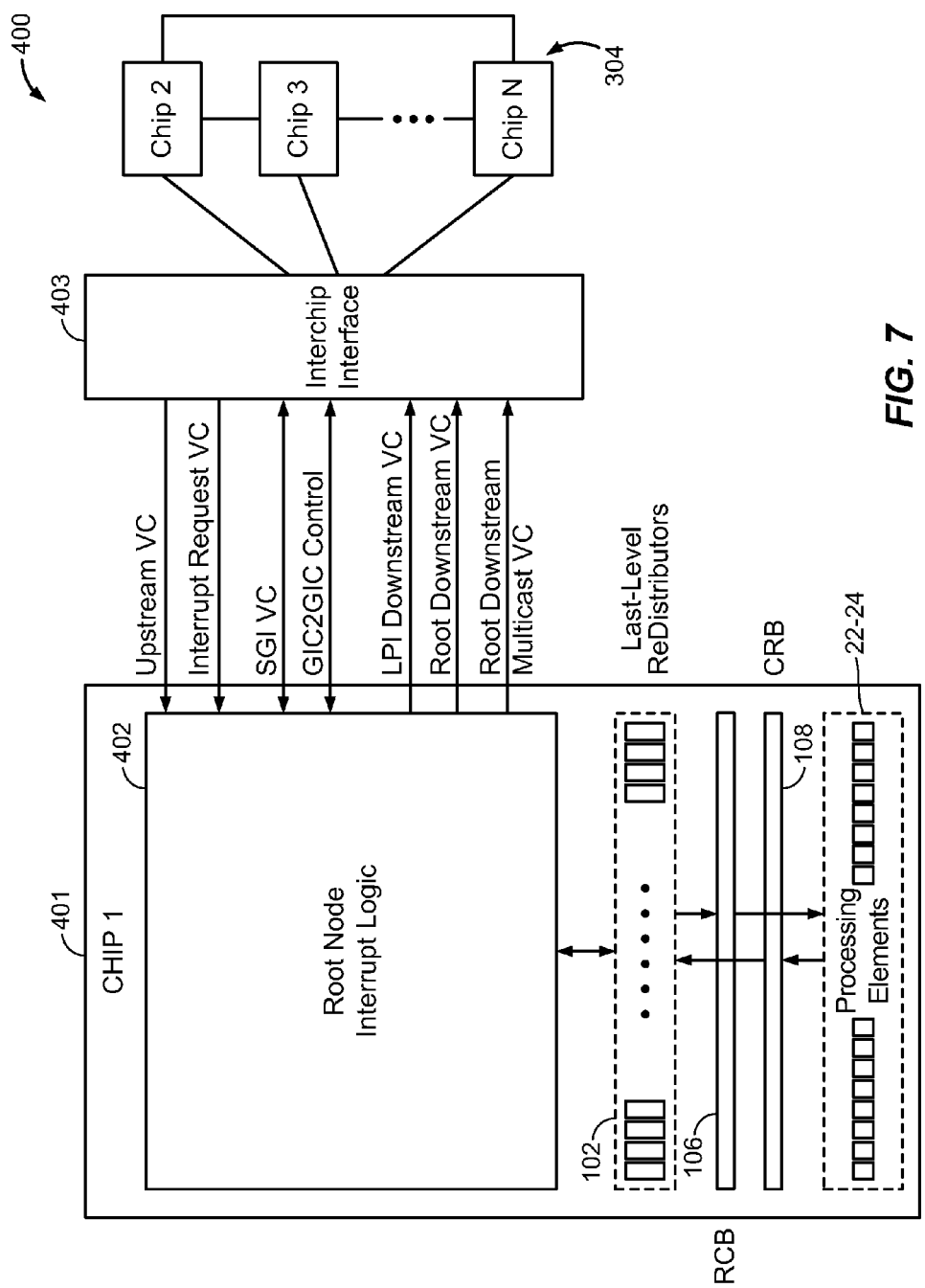
FIG. 7 is a conceptual block diagram illustrating an alternative exemplary architecture for interrupt signal distribution in a multi-chip multi-processor system.

FIG. 7 is a conceptual block diagram illustrating an alternative exemplary architecture for interrupt signal distribution in a multi-chip multi-processor system 400. Like the architecture shown in FIG. 6, the system 400 of FIG. 7 overcomes the problem of non-contiguous interrupt address space in an ARM multi-chip multi-processor system by having a single root. Like the architecture shown in FIG. 6, the system 400 of FIG. 7 overcomes the problem of differing message types interfering with one another and causing deadlock, but does so by employing an interrupt messaging scheme between and among the chips 401, 304 on shared physical interfaces that may be fewer in number than the number of message types. The system 400 also incorporates the interrupt distribution bus 100 (described herein in connection with FIGS. 3 and 4) between the last-level redistributors 102 and processing elements 22-24. The interrupt distribution bus 100 may be included in the root chip 401 (as shown) and any or all of the other chips 304 (not shown).

The system 400 includes the root chip 401 that communicates with the other chips 304 through an interchip interface 403 using predefined interrupt messages over virtual channels (VCs). The root chip 401 includes root node interrupt logic 402, last-level redistributors 102 (e.g., level 1 redistributors 18-20), the interrupt distribution bus 100 (shown as RCB 106 and CRB 108 in FIG. 7), and processing elements 22, 24. The root interrupt logic 402 may include the functionality of the distributor 12 and the level 3 redistributor 14, as well as other functionality for handling interrupt messages and interrupt virtual channels. The root interrupt logic 14 may be implemented using any suitable combination of logic hardware, such as address decoders, muxes, de-muxes, logic gates and the like.

The RCB 106 and CRB 108 are the buses used to send and receive messages between a last-level redistributor 102 and a destination CPU interface 104 using the encapsulation method and bussing scheme described in connection with FIGS. 3-4. Although not shown in FIG. 7, the RCB 106 and CRB 108 may be included in the other chips 304, and the redistributors 18-20 of FIG. 1 and clock domain interfaces 114, 116 and bus arbitrators 110, 112 of FIG. 3 may be included in the root chip 401 and any of the other chips 304.

The root chip 401 may be elected (i.e., selected) from the chips is the system 400 by setting a designated hardware pin on the chip 401, for example grounding the pin, to indicate that the chip is the root chip 401. Another way of electing the root chip 401 may include firmware designating the root chip 401 at boot-time from among the system chips using a node ID.

Each of the other chips 304 may include an internal interrupt distribution tree having the same components 12, 14, 16, 18, 20 and multiple processing elements 22-24 as previously described herein. Each of the other chips 304 may also include interrupt logic for handling the interrupt messages, interrupt virtual channels, and credits described herein. These internal components of each of the other chips 304 are not shown in order to simplify the drawing.

The interchip interface 403 is responsible for sending and receiving interrupt messages containing interrupt data between chips 401, 304 over the VCs. For example, it can route interrupt messages between the root chip 401 and any of the other chips 304, or alternatively it can route interrupt messages between the other chips 304, for example, between chip 2 and chip 3. The interchip interface 403 can be implemented as a shared bus, point to point bus, or similar interconnect. The VCs are multiplexed onto the physical interconnect bus. The interchip interface 403 is responsible for reliable delivery of message packet) from one chip/device to another. The interface 403 may have multiple connections to different chips/devices and is responsible for directing interrupt messages to the appropriate chip/device.

FIG. 7 shows examples of some of the VCs that may be sent between the chips 401, 304. These messages are further described below.

Root Downstream VC (Request Channel): This virtual channel conveys messages from the root node interrupt logic 402 to one of the other chips 304. Messages may include commands to SET and CLEAR an interrupt. In the example system 400, these messages are all non-posted, that is, they must receive an acknowledgement (ACK) from the destination chip.

Root Downstream Multi-cast VC (ACK channel): This virtual channel is used to convey messages from the root node logic 402 to a remote redistributor (level 2 or 1) on one of the chips 304. Messages on this VC may include commands that acknowledge requests that came from the remote redistributor to the root node logic 402. An example is an acknowledge to a write message from the remote redistributor to alter some state in the root node logic 402. In certain cases, multiple request messages from remote chips 304 can be acknowledged with a single "multi-cast" acknowledge message that includes enough information to acknowledge each of the requests. For example, a bit vector can be incorporated into the downstream response message to acknowledge requests from individual sources with only one response message.

LPI Downstream VC: This virtual channel is used to send messages, in this example, LPI messages, from one device to a remote redistributor. The source and destination devices can be any chips/devices 401, 304 in the interrupt hierarchy and need not include the device containing the root chip 401. In one implementation, this VC is used by a service that translates interrupt requests to specific LPIs (known as Interrupt Translation Service or ITS). The ITS can be on any device 304, 401 and the destination LPI that the ITS sends its output to may be on any device 304, 401 in the system 400.

Upstream VC: This virtual channel is used to send messages, in this example, both request and acknowledge messages from the remote chips 304 back to the root logic 402. The source device/chip may be any non-root device/chip 304 and the destination is the root device/chip 401. An example request message is an upstream write that advertises a processing element's interrupt priority mask. Some example upstream acknowledgements include: interrupt accepted, interrupt rejected, downstream write acknowledged and completed, and downstream write rejected.

SGI VC: This virtual channel is used to send software generated interrupts (SGIs) from any device 304, 401 to any other device 304, 401 in the system 400.

GIC2GIC Control VC: This virtual channel is used to return credits between generic interrupt control (GIC) entities in each of the chips 304, 410. Interrupt Request VC: This virtual channel is used to make interrupt requests to the root interrupt logic 402 from an I/O device. Table 1 illustrates the main function (although not necessarily sole function) of each virtual channel in terms of its use in deadlock avoidance, Quality of Service and whether it primarily contains Request information or Acknowledgement information.

TABLE 1

| Virtual Channel | Deadlock Avoidance | QoS Functions | Type |
|---|---|---|---|
| Root Downstream VC | X | | Request |
| Root Downstream Multi-cast | | | Acknowledgement |
| LPI Downstream VC | | X | Request |
| Upstream VC | X | | Request and Acknowledgement |
| SGI VC | | X | Request |
| GIC2GIC Control VC | X | | Acknowledgement |
| Interrupt Request VC | X | | Request |

In order to avoid deadlock and ensure certain levels of quality of service (e.g., fairness), the multiple VCs are implemented in the example system 400. In FIG. 7, these channels are show as separate lines going between the interrupt controller logic (including the root node logic 402) and the interchip interface 403. The VCs may be implemented with a credit mechanism so that no one VC can block packets on another VC.

As an example of a credit mechanism, each device may maintain a numerical value (e.g. a credit) for each class of message traffic. The credit value is known to both the transmitter and receiver at device setup (e.g. reset or device boot). When a transmitter sends a message of a certain class, the credit counter at both the transmitter and the receiver is decremented. The transmitter may only send messages of a certain class if the credit counter for that message class is non-zero. Once a credit counter for a certain class of message at the transmitter reaches 0, the transmitter may no longer send that class of message. When the receiver processes a message of a particular class such that it frees up a receive buffer for that class of message, the receiver sends a credit return back to the transmitter. Upon receipt of a credit return for a particular class of message, the transmitter increments its credit counter for the particular class of message. If the credit for a particular class of message is non-zero, then the transmitter may again send a message of the corresponding class. In this example, credits are assigned in units of a particular message class, but it is also possible to assign credits to other quantities, for example, bytes, or packets.

By way of example, a deadlock can occur in a simple interrupt communication scheme as follows. In a hypothetical simple system, all interrupt message traffic between devices would be carried over a single communications channel C between two nodes A and B, e.g., two chips. The communication from node A to B is represented by Cab, and communication from node B to A by Cba (one channel in each direction). In this example, node A is the root node and contains the root distributor (interrupt request message).

An example message transfer may occur as follows:
1. B sends an interrupt request to the top level (root distributor) in the root node (node A).
2. Node A receives this message over the communication channel C (Cba).
3. Node A processes the request and decodes the interrupt request as destined for a processing element on node B.
4. Node A sends an interrupt set message to node B over communications channel C (Cab). (Root Downstream message)
5. Node B sends the message internally to a processing element and then sends an acknowledge message back to node A over C (Cab). (Upstream)

In the above example scenario, it is possible for multiple messages to be sent from node B to node A in step 1, such that node A stops processing interrupt requests from node B until it receives an acknowledgement from node B (step 5). Node B's acknowledgments are blocked by the interrupt requests sent in step 1. Thus, no forward progress is possible and deadlock occurs.

By providing a separate virtual channel for acknowledgment messages (Upstream VC), as in system 400, acknowledgement messages cannot be blocked by request messages which appear on the Interrupt Request VC. Note, in the example system 400, the requests on the Upstream VC are restricted to those requests that are guaranteed to be serviced. Thus, upstream requests can never indefinitely block upstream acknowledgement messages.

A second example of how the system 400 avoids deadlocks is now described. The GIC2GIC Control VC is used to send credit returns between different communicating entities. For example, when a set interrupt message is sent from the root logic 402 to a remote redistributor in one of the chips 304, the return credit for that message is sent back on the dedicated GIC2GIC VC. Having a dedicated GIC2GIC VC avoids credit returns from being blocked by other requests. Blocking may occur in other systems, for example, if a remote device/chip 304 is sending a series of SPI interrupt requests to the root logic 402 and the root logic 402 is configured not to service any SPI interrupt request until it has a credit returned from the remote device 304. If the GIC2GIC VC were not separately available to send the credit return, a deadlock would result and no forward progress would be possible.

The functionality of the systems, devices, and their respective components, as well as any method steps and blocks described herein may be implemented in hardware or a combination of hardware and software or firmware executed by a processor. The software/firmware may be one or more programs having sets of instructions (e.g., code segments) executable by one or more digital circuits or processors, such as microprocessors, DSPs, embedded controllers, or intellectual property (IP) cores. If implemented in software/firmware, the instructions or code may be stored on one or more computer-readable media, such as a solid-state memory. Computer-readable medium includes any suitable computer storage medium. A storage medium may be any available medium that can be accessed by a computer. By way of example, and not limitation, such computer-readable medium can comprise RAM, ROM, EEPROM, NAND/NOR Flash, CD-ROM, or other solid-state storage, optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium.

The various embodiments described herein include a non-volatile, non-transitory computer readable medium such as, but not limited to, a server memory, CD, DVD, or other non-volatile memory that stores code (i.e. executable instructions) that may be executed by one or more processors of a manufacturing process. As such, an integrated circuit having the components, logic, etc. described herein may be manufactured by processing such code, examples of which include, but are not limited to, hardware description language (HDL) instructions and/or data, a Netlist, or some other descriptive language used in an electronic design automation (EDA) system such as an integrated circuit fabrication system. Thus one or more processors of a manufacturing system may execute such executable instructions by reading the computer readable medium to setup manufacturing of an integrated circuit having the features and functions, and being able to perform the methods of operation, of the various embodiments herein described.

Other embodiments and modifications of the methods, devices, systems and apparatuses described above will occur readily to those of ordinary skill in the art in view of these teachings. Thus, the foregoing description is illustrative and not restrictive. The invention is to be limited only by the following claims, which cover all such other embodiments and modifications, when viewed in conjunction with the above specification and accompanying drawings. The scope of the invention should, therefore, not be limited to the above description, but instead should be determined with reference to the appended claims along with their full scope of equivalents.

What is claimed is:

1. A system, comprising:
a plurality of logic devices including a distributor and redistributors configured in a hierarchical tree structure to distribute one or more incoming interrupts to at least one of a plurality of last-level redistributors;
a plurality of processing elements, each of the processing elements having an associated interrupt bus address and including a CPU interface operatively coupled to the shared interrupt bus and a CPU core operatively coupled to the CPU interface;
a shared interrupt bus coupling the plurality of last-level redistributors and the plurality of the processing elements;
wherein each of the plurality of last-level redistributors is configured to:
transfer the one or more incoming interrupts over the shared interrupt bus based on the interrupt bus address according to a first clock domain to at least one of the plurality of the processing elements a CPU interface of which operates according to a second clock domain having a clock frequency that is different than that of the first clock domain; and
transfer data to and from the shared interrupt bus according to the clock frequency of the first clock domain, and each of the plurality of the processing elements is configured to transfer data to and from the shared interrupt bus via the processing element's CPU interface according to the clock frequency of the second clock domain.

2. The system of claim 1, wherein the clock frequency of the first clock domain is lower than the clock frequency of the second clock domain.

3. The system of claim 1, further comprising a bus buffer coupled to the shared interrupt bus to synchronize transfers over the shared interrupt bus between the first clock domain and the second clock domain.

4. The system of claim 1, wherein the one or more incoming interrupts include interrupt messages defining at least a type of interrupt.

5. The system of claim 1, wherein each of the plurality of last-level redistributors is configured to transfer one or more interrupt packets over the shared interrupt bus where each of the one or more interrupt packet includes an address field containing the interrupt bus address of a destination processing element and an interrupt message field containing an interrupt message.

6. The system of claim 1, further comprising one or more bus arbitrators to arbitrate access to the shared interrupt bus among the plurality of processing elements and the plurality of last-level redistributors.

7. A method of distributing one or more interrupts in a system having a plurality of processing elements, each of the processing elements including a CPU interface operatively coupled to the shared interrupt bus and a CPU core operatively coupled to the CPU interface, comprising:
distributing one or more incoming interrupts through a plurality of logic devices including a distributor and redistributors configured in a hierarchical tree structure to at least one of a plurality of last-level redistributors;
transferring the one or more incoming interrupts by the at least one of a plurality of last-level redistributors over the shared interrupt bus based on the interrupt bus address according to a first clock domain to at least one of the plurality of the processing elements a CPU interface of which operates according to a second clock domain having a clock frequency that is different than that of the first clock domain; and
transferring data by each of the plurality of last-level redistributors to and from the shared interrupt bus according to the clock frequency of the first clock domain signal and transferring data by each of the plurality of the processing elements via the processing element's CPU interface to and from the shared interrupt bus according to the clock frequency of the second clock domain signal.

8. The method of claim 7, wherein the clock frequency of the first clock domain signal is lower than the clock frequency of the second clock domain signal.

9. The method of claim 7, further comprising:
buffering the shared interrupt bus to synchronize transfers over the shared interrupt bus between a first clock domain and a second clock domain.

10. The method of claim 7, wherein the incoming interrupts include interrupt messages defining at least a type of interrupt.

11. The method of claim 7, further comprising:
transferring, from the redistributors, interrupt packets over the shared interrupt bus, where each interrupt packet includes an address field containing the interrupt bus address of a destination processing element and an interrupt message field containing an interrupt message.

12. The method of claim 7, further comprising:
arbitrating access to the shared interrupt bus among the processing elements and the plurality of last-level redistributors.

13. A system, comprising:
a plurality of means configured in a hierarchical tree structure to distribute one or more incoming interrupts to at least one of a plurality of last level means;
a plurality of processing elements, each of the processing elements having an associated bus address and including a CPU interface operatively coupled to the shared interrupt bus and a CPU core operatively coupled to the CPU interface; and
a shared interrupt bus coupling the of a plurality of last-level means and the processing elements;
wherein each of the plurality of last level means is configured to:
transfer the one or more incoming interrupts over the shared interrupt bus based on the interrupt bus address according to a first clock domain to at least one of the plurality of the processing elements a CPU interface of which operates according to a second clock domain having a clock frequency that is different than that of the first clock domain; and transfer data to and from the shared interrupt bus according to the clock frequency of the first clock domain and each of the plurality of the processing elements is configured to transfer data to and from the shared interrupt bus via the processing element's CPU interface according to the clock frequency of the second clock domain.

14. A non-transitory computer-readable memory comprising:

executable instructions that when executed by at least one processor of an electronic design automation system (or integrated circuit fabrication system), that when executed cause the at least one processor to:

provide a plurality of logic devices including a distributor and redistributors configured in a hierarchical tree structure to distribute one or more incoming interrupts to at least one of a plurality of last-level redistributors, provide a plurality of processing elements, each of the processing elements having an associated interrupt bus address and including a CPU interface operatively coupled to the shared interrupt bus and a CPU core operatively coupled to the CPU interface:

provide a shared interrupt bus coupling the plurality of last-level redistributors and the plurality of the processing elements;

wherein each of the plurality of last-level redistributors is configured to:

transfer the one or more of the incoming interrupts over the shared interrupt bus based on the interrupt bus address according to a first clock domain to at least one of the plurality of the processing elements a CPU interface of which operates according to a second clock domain having a clock frequency that is different than that of the first clock domain; and transfer data to and from the shared interrupt bus according to the clock frequency of the first clock domain and each of the plurality of the processing elements is configured to transfer data to and from the shared interrupt bus via the processing element's CPU interface according to the clock frequency of the second clock domain.

* * * * *